United States Patent [19]

Neubert

[11] 4,204,984

[45] May 27, 1980

[54] LIGNIN AMINE CARBOXYLATED CONJUGATED DIENE TIRE CORD ADHESIVES

[75] Inventor: Terry C. Neubert, Ravenna, Ohio

[73] Assignee: The General Tire & Rubber Company, Akron, Ohio

[21] Appl. No.: 842,851

[22] Filed: Oct. 17, 1977

[51] Int. Cl.$^2$ .................. C08L 9/00; C08L 47/00; C09J 3/14; C09J 3/28
[52] U.S. Cl. ..................... 260/17.5; 156/110 A; 156/331; 260/29.4 UA; 260/5; 428/392; 428/393; 428/395
[58] Field of Search .............. 260/29.4 UA, 17.5, 852, 260/4, 5

[56] References Cited

U.S. PATENT DOCUMENTS

| | | | |
|---|---|---|---|
| 2,562,898 | 5/1946 | Evans et al. | 260/17.5 |
| 2,751,650 | 6/1956 | Froberger | 260/17.5 |
| 3,990,928 | 11/1976 | Schmidt-Hellerau | 260/17.5 |
| 3,991,022 | 11/1976 | Dimitri | 260/17.5 |

FOREIGN PATENT DOCUMENTS 802611  10/1958  United Kingdom ................ 260/17.5

*Primary Examiner*—Earl A. Nielsen

[57] ABSTRACT

Rubber compounds are readily bonded to tire cords using a dip process in which the dip contains an alkaline aqueous dispersion of a mixture of a major amount by weight of a rubbery carboxylated conjugated diene copolymer and a minor amount of a lignin amine formaldehyde reaction product.

3 Claims, No Drawings

LIGNIN AMINE CARBOXYLATED CONJUGATED DIENE TIRE CORD ADHESIVES

BACKGROUND OF THE INVENTION

1. Field of the Invention

The present invention relates to compositions and methods of bonding cord tire reinforcement to the conjugated diene based rubber of tire carcasses and the improved structure obtained thereby.

2. Description of the Prior Art

Tire cord is received from the manufacturer in the form of a fabric. The general practice is to prepare the cord by applying a dip coating of a latex. The dip coating of the cord generally used contains a vinyl pyridine/styrene/butadiene copolymer and a resorcinol-formaldehyde (RF) resin. While these dips are quite effective in performing their desired function, the resorcinol and vinyl pyridine components are expensive and often unobtainable in the quantities needed. In addition, better adhesion would be preferred.

Materials, in addition to RF resins, have been used in the prior art to improve adhesion in special circumstances. For instance, proprietary formulations of unknown composition are marketed for this purpose. In addition, lignin sulfonates are known as replacements for resorcinol in cord dips, see U.S. Pat. Nos. 4,016,119 and 4,026,744 of Elmer, 1977. Also, acrylic acid type copolymers have been used in cord dips, see U.S. Pat. Nos. 2,773,703; 3,364,100 Danielson (1968), 3,367,793 Atwell (1968), 3,408,249 Brown (1968), 3,843,484; and 3,855,168. Also see British Pat. No. 1,256,705 for terpolymers of butadiene and unsaturated dicarboxylic acids.

SUMMARY OF THE INVENTION

According to the present invention, it has been discovered that reinforcing cords, particularly glass, but also other cords such as rayon, nylon, polyester, and aramid (also known as Kevlar)*, can be directly bonded or adhered to cured rubber by first dipping the cords in a dip containing an aqueous alkaline dispersion of a mixture of a rubbery carboxylated conjugated diene copolymer and a formaldehyde-lignin amine reaction product, drying the same, and combining said dipped and dried element with a vulcanizable conjugated diene rubber compound such as a butadiene-styrene rubber compound and vulcanizing the same. Reinforcing cords treated in this fashion exhibit high rubber to cord adhesion values.

*available from duPont

The lignin amines are used to emulsify asphalt and are available or can be made available when resorcinol is in short supply. The advantages of the present invention over the prior art is that the lignin amines carboxylated conjugated diene dips provide better cord adhesion to rubber than commercial dips, have further improved adhesion upon aging, and are cheaper.

DESCRIPTION OF THE PREFERRED EMBODIMENTS

In the present application the term "cords" is intended to include reinforcing elements used in rubber products including fibers, continuous filaments, staple, tow, yarns, fabric and the like, particularly cords for use in building the carcasses of tires such as car and truck tires.

The reinforcing element or cord comprises a plurality of substantially continuous fibers or monofilaments.

In the case of glass, the reinforcing element or fibers contain little or no twist. In other words, twist is not intentionally applied to the element or fibers; the only twist, if any, in the element or fibers is that occasioned on passing through the glass fiber processing apparatus and on packaging or winding up the cord to form a bobbin or spool. However, in a continuous process, the elements can proceed directly from the glass processing apparatus, can be dipped in the aqueous adhesive cord dip, dried, and given a twist of about 1.5 turns per inch thereafter. The elements then are woven into tire fabric having about one quite small pick thread or element, nylon or polyester, which may be a monofilament, per inch and calendered with a rubber ply or skim stock. The glass fiber reinforced ply stock is then ready to be used in the manufacture of a tire or for other purposes.

Glass compositions, polyesters, polyamides and a number of other materials, useful in making the fibers for the reinforcing element or glass tire cord are well known to the art. One of the preferred glasses to use is a glass known as 'E' glass and described in "Mechanics of Pneumatic Tires," Clark, National Bureau of Standards Monograph 122, U.S. Dept. of Commerce, issued Nov. 1971, pages 241–243, 290 and 291. The number of filaments or fibers employed in the fiber reinforcing element or cord can vary considerably depending on the ultimate use or service requirements. Likewise, the number of strands of fibers used to make a fiber reinforcing element or cord can vary widely. In general, the number of filaments in the fiber reinforcing element or cord for a passenger car tire can vary from about 500 to 3,000 and the number of strands in the reinforcing element can vary from 1 to 10, preferably the number of strands is from 1 to 7 and the total number of filaments about 2,000. A representative commercial glass tire cord known as G-75 (or G-72, 5/0) has 5 strands each with 408 glass filaments. Another representative cord known as G-15 has a single strand containing 2,040 glass filaments. In this connection reference is made to Wolf, "Rubber Journal," February, 1971, pages 26 and 27 and U.S. Pat. No. 3,433,689.

Shortly after the glass fibers are formed they are usually sized (by spraying or dipping and so forth and air drying) with a very small amount of fractional amount by weight of a material which acts as a protective coating during processing and handling of the glass fibers in forming the strands or reinforcing elements and during packaging. During the subsequent dipping in the aqueous adhesive tire cord dip, it is believed that the size is not removed. Materials for use as sizes for glass fibers are well known to the art. It is preferred to use a silane as a size, especially a silane which has groups which can bond or coordinate chemically or physically with at least parts of the surface of the glass of the glass fiber and with at least one or more of the components of the glass fiber aqueous adhesive cord dip. A very useful size to employ on the glass fibers is gamma-aminopropyl triethoxy silane, or similar amino-alkyl alkoxy silanes, which, when applied to the glass fibers, hydrolyzes and polymerizes to form a poly (aminosiloxane) in which a portion of the polymer is attached to the glass and another portion contains amine groups (having active hydrogen atoms) for reaction with components of the cord dip such as the lignin amine resin or the carboxylated butadiene copolymer compound. Various glass fiber sizing compounds and compositions are shown in U.S. Pat. Nos. 3,252,278; 3,287,204 and 3,538,974.

The type of rubber latex used in the tire cord dip bath of this invention is a latex of a copolymer of a conjugated diolefin having 4 to 6 carbon atoms and an acrylic acid, lower alkyl substituted acrylic acid. The alkyl groups has from 1 to 6 carbon atoms and is preferably methyl. The rubber latex is of the type described in U.S. Pat. No. 2,774,703 and comprises an aqueous dispersion of a copolymer of 50 to 95% by weight of a conjugated diolefin having 4 to 6 carbon atoms, 5 to 40% of an acrylic acid or lower alkyl acrylic acid and 0 to 45% of a styrene.

Examples of suitable non-conjugated dienes are acrylic acid/butadiene, methacrylic acid/butadiene and itaconic acid/isoprene.

In practicing this invention, a latex of a copolymer of from about 60 to 99% by weight, of 1,3-butadiene and 1 to 40% by weight of acrylic acid or lower alkyl acid is used. The preferred range is 80 to 95% conjugated diene and 5 to 20% of acrylic or lower alkyl acrylic acid, the percentage based on the weight of the two recited components. The Mooney viscosity range of the dry solids is 40 to 120, preferably 40 to 90 ML-4. Other components may be present but are not used in the calculation. Excellent results are obtained using a latex of a copolymer of about 80% of 1,3-butadiene, and 20% of methacrylic acid, by weight, having a total solids content of around 30 to 50%. The copolymer has a 4 minute Mooney viscosity ML-4 of 80 at 212° F. Further disclosures relating to carboxylated butadiene copolymer latices may be found in U.S. Pat. Nos. 2,364,100; 3,367,793; 3,408,249 3,774,703; 3,843,484 and 3,855,168. The copolymer can be replaced in a minor part with other elastomeric materials such as styrene-butadiene, carboxylated styrene-butadiene and other latex forming materials well known in the cord dip art.

The lignin amines usable in the dip of the present invention are selected from materials that are known in the art. They are made, for example, by the reaction of ammonia, a primary or secondary amine with formaldehyde and lignin. The reaction of the amine results in the introduction of amine groups into the lignin molecule. The process is described in U.S. Pat. No. 2,709,696, Wiest, 1955. The preferred amine as a starting material is the secondary amine, most preferably dimethyl amine.

A second procedure for making lignin amines is set forth in U.S. Pat. No. 3,718,639 Falkehey, 1973. This involves reacting a lignin with the reaction product of an epichlorohydrin and a tertiary amine.

A third class of lignin amines useful in the practice of the present invention are the quaternary ammonium salts of lignin as set forth in U.S. Pat. No. 3,407,188 Cavagna, 1968.

The lignin amines used in the practice of the present invention are water soluble. The preferred pH range is from 7 to 12. The nitrogen content of the lignin amine can vary from 0.1 to 6% and preferably to 3%.

Primary, secondary and tertiary amines suitable as starting material in this invention are presented by the general formula:

wherein at least two of $R_1$, $R_2$ and $R_3$ are methyl and/or hydrogen groups and the other $R_3$ contains up to 18 carbon atoms. Those tertiary amines possessing at least two methyl and/or hydrogen groups attached directly to the nitrogen are used because of their superior reactivity with formaldehyde or epichlorohydrin to form the desired intermediate. This reactivity with epichlorohydrin is retained even when the third group of tertiary amine contains as many as 18 carbon atoms, such as is found in dimethyl-stearyl amine. This high reactivity is believed to result from the low order of stearic hindrance imparted by the two methyl groups, allowing for intimate contact of epihalohydrin with the free electron pair of the tertiary amino nitrogen. By way of example, the following amines are mentioned as particularly suitable for carrying out this invention: methyl, dimethyl, trimethyl, dimethyl-benzyl, methyldodecyl, dimethyloctyl and dimethylstearyl amines. The preferred secondary amine is the dimethyl amine.

The lignin amine reaction product of the present invention is prepared by dissolving a sufficient amount of NaOH into water to render the final solution basic; slow addition of weighed amounts of lignin amine to the agitated solution to achieve uniform wetting of the amine; agitation until the amine dissolves and addition with stirring of measured amounts of formaldehyde solution with agitation.

The reaction product (including unreacted components, if present) contains from 60 to 100% preferably from 70 to 90% lignin amine and from 0 to 40% preferably 10 to 30% formaldehyde. All percentages are based on dry solids of the above recited components.

The heat reactable formaldehyde-lignin amine reaction product is preferably made by reacting formaldehyde (or formaldehyde donor) with lignin amine in aqueous media using sodium hydroxide and the like as a catalyst to form water soluble resins containing amine hydroxyl and methylol groups.

The final dip is prepared by slow addition of the reaction product of the copolymer latex. After addition the mixture is aged, preferably at least 16 hours, before use as a cord dip. The pH of the final dip ranges from about 8 to 11 preferably about 9 to 10.

The ratio of the conjugated diene copolymer (on a dry basis) to the reaction product of formaldehyde and lignin amine is from about 100:5 to 100:30 parts by weight, preferably from about 100:8 to 100:20 parts by weight.

Water is used in the dip in an amount sufficient to provide for the desired dispersion of the conjugated diene latex particles and the solution or dispersion of the lignin amine reaction product and for the proper solids content to get the necessary pick-up of solids on and penetration between the fibers of the tire cord.

The dip thus consists essentially of an aqueous dispersion of the conjugated diene copolymer latex, and the lignin amine reaction product; the reaction product being present in a total amount (as dry solids, dispersed or dissolved in the water per hundred parts of latex solids) of from about 1 to 30 parts by weight, preferably 8 to 20 parts and the copolymer is present at a level of 100 parts on a dry weight basis (assuming complete reaction). Sufficient alkaline material is usually present from the lignin amine reaction product solution to render the dip alkaline or additional alkaline material such as NaOH can be added to achieve this purpose. The function of the alkaline material is to prevent premature coagulation of the conjugated diene copolymer and also to catalyze the formaldehyde-lignin amine reaction.

The concentration of lignin amine reaction product on a dry basis in the aqueous dispersion is about 0.5% to about 10% and preferably about 2 to about 7%. The concentration of conjugated diene copolymer on a dry basis is from about 7 to 40% and preferably about 20 to 35%. The concentration of solids in the aqueous dispersion (or dip) on a dry basis is 15% to 45%, preferably 20% to 40%. A too high solids content results in coagulation of the latex and a too low solids content results in a low D.P.U. and poor performance of the cord.

In order to apply the adhesive dip to the cords in a reliable manner, the cords are fed through an adhesive dip bath containing the conjugated diene copolymer and the lignin amine reaction product, into a drying oven where they are dried. Also, as the cords leave the oven they enter a cooling zone where they are air cooled. In each case, the adhesive-coated cords leaving the dip are dried in the oven at from about 150° to 360° C. for from about 2 to 150 seconds. The time the cord remains in the dip is about a second or so or at least for a period of time sufficient to allow wetting of the cord by the adhesive mixture.

The adhesive containing reinforcing elements of this invention is preferably adhered to a vulcanized blend of natural rubber, polybutadiene rubber, and rubbery butadiene-styrene copolymer by curing the same in combination together. The adhesive containing reinforcing element can also be adhered to other vulcanized conjugated diene rubber, by curing or vulcanizing the same in combination with the rubber. Examples of other conjugated diene rubbers include: nitrile rubbers, chloroprene rubbers, polyisoprenes, carboxylated butadiene rubbers, vinyl pyridine rubbers, acrylic rubbers, isoprene-acrylonitrile rubbers and the like and mixtures of the same. These rubbers, prior to curing, can be mixed with the usual compounding ingredients including sulfur, stearic acid, zinc oxide, magnesium oxide, accelerators, antioxidants, antizonants and other curatives and the like well known to those skilled in the art for the particular rubbers being employed. Rubbers, when proportions are referred to as referred to here and in the claims, refers to the elastomer component and excludes the above compounding ingredients, e.g., a reference to a major component of the rubber being a conjugated diene polymer would refer to a major component of the elastomeric content of the composition. The rubbers referred to above are old and well known in the art and will not be described in detail here.

The major diene component of the rubber used in the practice of the present invention is a conjugated diene as opposed to a non-conjugated diene. Preferably, the entire elastomeric component is conjugated diene polymer, free of ethylene/propylene/non-conjugated diene.

Fibers, yarns, filaments, cords or fabric and the like coated with the adhesive of the present invention can have from about 3 to 50% by weight (dry) total solids from the adhesive dip on the cord based on the weight of the undipped cord (D.P.U.) and can be used in the manufacture of radial, bias, or belted-bias passenger tires, truck tires, motorcycle and bicycle tires, off-the-road tires, airplane tires, transmission belts, V-belts, conveyor belts, hose gaskets, rubbers, tarpaulins and the like. The D.P.U. varies as to substrate as is known in the art. Glass cord for example, requires a D.P.U. of 15 to 30% and an organic cord requires 2 to 10% preferably 3 to 8%.

The following examples will serve to illustrate the invention with more particularity to those skilled in the art. In these examples the parts and percentages are parts and percentages by weight unless otherwise indicated.

The H-adhesion test referred to above measures the static adhesion of the dried adhesive coated cord to cured rubber.

In each case the rubber test specimens are made from a standard type rubber compositions using the following recipe:

| Stock | Parts by Weight |
|---|---|
| Natural Rubber (No. 3 smoked sheet) | 36.50 |
| Butadiene-styrene rubber copolymer averge 23.5% bound styrene, emulsion polymerized | 43.50 |
| Polybutadiene (solution polymerized BD, about 93% cis-1,4, Raw Mooney ML-4@212° F. about 40-50) | 20.0 |
| Carbon black, fast extrusion furnace | 35.0 |
| Carbon black, high abrasion furnace (high structure) | 35.0 |
| Alkyl aromatic polyindene resin reinforcing and processing aid, Picco 100, Pennsylvania Industrial Chemical Corp. | 4.5 |
| Naphthenic oil, Circosol type 2XH, Sun Oil Co. | 32.80 |
| Zinc oxide | 3.8 |
| Stearic acid | 1.5 |
| Mixture of mono, di and tristyrenated phenols, AgeRite Spar, R.T. Vanderbilt Co., Inc., antioxidant | 1.2 |
| Benzothiazyl disulfide, Altax, R.T. Vanderbilt Co., Inc., accelerator | 1.2 |
| Tetramethyl thiuram monosulfide, active ingredient, Thionex, accelerator, E.I. duPont de Nemours & Co., Inc. | 0.1 |
| Crystex, about 80% insoluble sulfur and 20% petroleum oil, Stauffer Chemical Co. | 3.0 |

Dips were prepared that contained a varying molar ratio of lignin amine to formaldehyde varying amounts of lignin amine per 100 parts of butadiene latex solids. The ratio of butadiene to methacrylic acid was also varied. The dips were prepared by dissolving weighed amounts of lignin amine in water by agitation; addition of measured amount of NaOH solution if the solution is not sufficiently basic due to lignin amine, agitation until powder dissolved; addition with stirring of measured amount of formaldehyde solution; agitation and slow addition of this resin to a stirred butadiene-methacrylic acid copolymer. The dips are aged at least 16 hours after formulation before being used to coat cords. The butadiene-methacrylic acid copolymer latexes are 41% solids in water solution. The copolymer latexes are made by conventional emulsion polymerization on acid stable surfactants.

In each of the following examples each cord tested was passed through a cord dip, dried and tested. The H-adhesion test was run using the following procedure.

In every case the cords to be treated are placed in parallel positions in a multiple-strand mold of the type described in the single-cord H-pull adhesion test designated ASTM D 2138-67, the mold is filled with unvulcanized rubber of the above-described compositions, the cords being maintained under a tension of 50 grams each, and the rubber is cured 20 minutes to the elastic state. Each rubber test specimen is 6 mm thick and has a 9 mm cord embedment.

After the rubber has been cured, the hot reticulate cured rubber piece is removed from the mold, cooled, and H-test specimens are cut from said piece, each specimen consisting of a single cord encased in rubber and having a length of around one inch or so. The specimens are then aged at least 16 hours at room temperature. The force required to separate the cord from the rubber is then determined using an Instron tester provided with specimen grips. The maximum force in pounds required to separate the cord from the rubber is the H-adhesion value. The hot pad test referred to in the H-adhesion testing refers to heating the embedded cord sample for four hours (unless otherwise specified), cooling the sample to 25° C., then running the H-adhesion test.

D.P.U. refers to dip pickup in percent by dry weight and represents the weight of the coating divided by the bare glass or other cord weight.

The wet dipped cords of the following examples were all predried at 98° C. prior to the high temperature drying step recited in the examples. In the following examples all of the dips had a 20% solids level. The solvent was water. All parts and percentages are on a dry solids basis unless otherwise specified.

The lignin L-3 (lignin amine) used in the examples was a lignin-formaldehyde-dimethyl amine reaction product believed to be produced by the procedure set forth in the first example of U.S. Pat. No. 2,709,696. The glass cord used was sized K filament PPG glass normally used in tires. After dipping, the cord was dried at 236° C. for 20 seconds. The cord was then embedded in the rubber stock described earlier and the H-adhesion values obtained are listed below under the respective aging times and conditions.

The B/MAA was a butadiene-methacrylic acid copolymer. The ratios 95/5, 90/10 and 80/20 refer to the ratios of butadiene to methacrylic acid in the copolymer.

TABLE I

| ROOM TEMPERATURE H ADHESION ON PPG GLASS CORD | | | |
|---|---|---|---|
| Dip Aged at R.T.(room temp.) | Newtons After 24 hrs. | Newtons After 144 hrs. | Newtons After 10 days at 50° C. |
| 1. Vinyl Pyridine latex** (55) 95/5-B/MAA (45) Lignin L-3 (11) Formaldehyde (2.4) | Dip Aged* at 50° C. 128.1 145.5 | Dip Aged at 50° C. 175.2 141 | 181.5 |
| 2. 95/5-B/MAA (100) Lignin L-3 (14) Formaldehyde (3.2) | 149 | 140.1 | |
| 3. 90/10-B/MAA (100) Lignin L-3(14) Formaldehyde (3.2) | 160.1 | | |
| 4. 80/20-B/MAA (100) Lignin L-3 (14) Formaldehyde (3.2) | 199.3 | | |

*All values increase 27 to 36 Newtons by aging the cured sheets at least 72 hours before pulling the H-adhesion.
**Conventional butadiene styrene vinyl pyridine latex The above dips were all run at 20% total solids. The numbers in parenthesis refer to amounts in parts by dry weight.

NON-SPECIFIC EXAMPLES

A number of amine substituted lignins including quaternary ammonium salts were evaluated in cord dip compositions similar to those set forth in the previous examples. The amines were, (1) produced by reacting a primary amine with formaldehyde and a lignin, (2) produced by reacting trimethyl amine with epichlorohydrin then reacting the reaction product with a lignin, (3) quaternary amine substituted lignins, (4) other amine substituted lignins supplied by Westvaco Corporation, N.Y., N.Y. Most of the amine substituted lignins performed satisfactorily in cord dips.

The cord dips of the present invention work best on glass, rayon, nylon; fair on Kevlar and poor on polyester.

What is claimed is:

1. A composition comprising an aqueous alkaline dispersion of a minor amount by weight of a mixture of 100 parts of a copolymer of a conjugated diolefin having 4 to 6 carbon atoms and an acrylic acid or lower alkyl substituted acrylic acid and from 6 to 30 parts of a reaction product of formaldehyde and a lignin amine, wherein the lignin amine is selected from the class consisting of a reaction product of lignin, formaldehyde and a primary or secondary amine; a reaction product of lignin with a reaction product of an epichlorohydrin and a tertiary amine; and a a salt of a quaternized lignin amine.

2. A composition according to claim 1 in which said two-component mixture is present in said dispersion in an amount of from about 15 to 45% by weight (as dry solids).

3. A composition according to claim 1 in which said reaction product contains about 5 to 20 parts by weight of a lignin amine and 0 to 10 parts by weight of formaldehyde.

* * * * *

UNITED STATES PATENT AND TRADEMARK OFFICE
CERTIFICATE OF CORRECTION

PATENT NO. : 4,204,984
DATED : May 27, 1980
INVENTOR(S) : Terry C. Neubert

It is certified that error appears in the above-identified patent and that said Letters Patent are hereby corrected as shown below:

Column 8, line 57: Delete "a" (second occurence).

Signed and Sealed this

Twenty-ninth Day of July 1980

[SEAL]

Attest:

SIDNEY A. DIAMOND

Attesting Officer

Commissioner of Patents and Trademarks